(12) United States Patent
Overby, Jr. et al.

(10) Patent No.: US 8,195,806 B2
(45) Date of Patent: Jun. 5, 2012

(54) MANAGING REMOTE HOST VISIBILITY IN A PROXY SERVER ENVIRONMENT

(75) Inventors: Linwood H. Overby, Jr., Raleigh, NC (US); Jeffery L. Smith, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 734 days.

(21) Appl. No.: 11/778,406

(22) Filed: Jul. 16, 2007

(65) Prior Publication Data

US 2009/0024750 A1 Jan. 22, 2009

(51) Int. Cl.
G06F 15/16 (2006.01)
(52) U.S. Cl. .......................................... 709/227; 709/230
(58) Field of Classification Search .................. 709/227, 709/230
See application file for complete search history.

(56) References Cited

U.S. PATENT DOCUMENTS

| | | | | |
|---|---|---|---|---|
| 6,304,908 B1 * | 10/2001 | Kalajan | | 709/229 |
| 6,961,783 B1 * | 11/2005 | Cook et al. | | 709/245 |
| 7,093,288 B1 * | 8/2006 | Hydrie et al. | | 726/13 |
| 7,143,438 B1 * | 11/2006 | Coss et al. | | 726/11 |
| 2002/0032773 A1 * | 3/2002 | Jiang | | 709/225 |
| 2003/0018813 A1 * | 1/2003 | Antes et al. | | 709/245 |
| 2003/0065711 A1 * | 4/2003 | Acharya et al. | | 709/203 |
| 2003/0188001 A1 * | 10/2003 | Eisenberg et al. | | 709/229 |
| 2005/0038898 A1 * | 2/2005 | Mittig et al. | | 709/230 |
| 2006/0224897 A1 * | 10/2006 | Kikuchi et al. | | 713/182 |

OTHER PUBLICATIONS

Sisalem et al., "Denial of service attacks targeting a SIP VoIP infrastructure: attack scenarios and prevention mechanisms", Oct. 2006, IEEE Network Press, IEEE Networks Magazine vol. 20 No. 5, p. 26-31.*
Johnson et al., "Nymble: anonymous IP-address blocking", Jun. 2007, PET'07 Proceedings of the 7th International conference on Privacy enhancing technologies, Springer, Hanover, NH, p. 1-20.*
Reynolds et al., "Secure IP telephony using Multi-layered Protection", Feb. 2003, 10th Annual Network and Distributed System Security Symposium, San Diego, California, p. 1-13.*

* cited by examiner

*Primary Examiner* — Jeffrey R Swearingen
*Assistant Examiner* — Taylor Elfervig
(74) *Attorney, Agent, or Firm* — Cuenot, Forsythe & Kim, LLC

(57) ABSTRACT

Embodiments of the present invention address deficiencies of the art in respect to the visibility of an IP address for a remote resource behind a proxy server and provide a novel and non-obvious method, system and computer program product for managing remote host visibility in a proxy server environment. In one embodiment of the invention, a method for managing remote resource visibility in a proxy server environment can be provided. The method can include establishing a secure connection between a proxy server and a destination server, proxying different connections between different remote hosts and the destination server through the proxy server, providing remote host information for each of the different remote hosts, including IP address, port and protocol, for example, to the destination server over the secure connection, and mapping each provided IP address to an IP address for a corresponding one of the proxied different connections.

15 Claims, 1 Drawing Sheet

MANAGING REMOTE HOST VISIBILITY IN A PROXY SERVER ENVIRONMENT

BACKGROUND OF THE INVENTION

1. Field of the Invention

The present invention relates to the field of network computing and more particularly to the field of proxy server disposition within a computing network.

2. Description of the Related Art

A proxy server is a server configured to service requests of coupled clients by making or passing requests on behalf of the coupled clients to intended destination servers. Generally, a computing client connects to the proxy server, requests a remote resource on a specified destination computing server, for instance a file, a connection, or a web page to name a few. The proxy server in turn can retrieve the requested remote resource on behalf of the computing client by connecting to the specified destination computing server. In certain instances, the proxy server can alter the original request for a remote resource, or the proxy server can alter the retrieved response before passing the response to the computing client. In other instances, the proxy server can service the request without seeking assistance from the specified destination computing server.

Different proxy servers fulfill different roles in the computing network. For example, a proxy server that removes identifying information from a client request for the purpose of anonymity is referred to as an anonymizing proxy server. Also, a proxy server configured to service client requests without contacting the specified destination server, but by retrieving content saved locally from a previous request is referred to as a caching proxy. An intercepting proxy combines the functionality of a general proxy server with a gateway server. Connections made by coupled clients through the gateway are redirected through the proxy without client-side configuration. Intercepting proxies are commonly used to prevent avoidance of an acceptable use policy, and to ease administrative burden, since no client browser configuration is required.

An open proxy is a proxy server configured to accept client connections from any Internet protocol (IP) address and make connections to any remote resource. Finally, a transparent proxy is a proxy server that does not modify the request or response beyond what is required for proxy authentication and identification, whereas a non-transparent proxy is a proxy server that modifies the request or response in order to provide some added service to the user agent, such as group annotation services, media type transformation, protocol reduction, or anonymity filtering.

When a proxy server is used to proxy a transport control protocol (TCP) connection between a remote resource and middleware or another application on a destination server, neither the destination server nor the middleware or application can view the IP address of the remote resource as the proxy server replaces the remote IP address and source port in the IP and transport headers with an IP address and source port associated with the proxy server. As such, the destination server views the proxy server rather than the remote resource as the endpoint.

The lack of visibility of the remote resource in the destination server can defeat the operation of some operating system and application functions within the destination server. Those functions which can depend upon the knowledge and visibility of an IP address, protocol, or port for a remote resource can include policy statement processing for specific resources associated with specific IP addresses, protocols, or port including packet filtering and quality of service (QoS) processing for enforcing a service level agreement (SLA). Other applications rely upon the knowledge and visibility of an IP address, protocols, or ports for a remote resource including terminal emulators that map IP addresses, protocols, or ports to mainframe addresses. Finally, network security applications including intrusion detection systems prefer IP address visibility of remote resources to track the source of a potential attack.

BRIEF SUMMARY OF THE INVENTION

Embodiments of the present invention address deficiencies of the art in respect to the visibility of an IP address for a remote resource behind a proxy server and provide a novel and non-obvious method, system and computer program product for managing remote host visibility in a proxy server environment. In one embodiment of the invention, a method for managing remote resource visibility in a proxy server environment can be provided. The method can include establishing a secure connection between a proxy server and a destination server, redirecting different connections between different remote hosts and the destination server through the proxy server, providing remote resource information including an IP address, source port and connection protocol, for each of the different remote hosts along with connection identification information including source IP address, destination IP address, source port, destination port and connection protocol for a corresponding one of the proxied connections to the destination server over the secure connection.

In another embodiment of the invention, a network data processing system can be configured for remote host visibility for proxied connections. The system can include a destination server hosting an application and a proxy server coupled to destination server over a computer communications network. The proxy server can include a configuration to proxy connections between a plurality of remote hosts and the destination server. Additionally, a secure connection can be established between the proxy server and the destination server separate from connections proxied by the proxy server. Finally, a redirector can be disposed in the proxy server. The redirector can include a configuration to provide remote host information, including IP address, source port and connection protocol, amongst the remote hosts along with connection identification information including source IP address, destination IP address, source port, destination port and connection protocol for a corresponding one of the proxied connections to the destination server over the secure connection to remote visibility logic disposed within the destination server. The remote visibility logic in turn can include program code enabled to map the IP address, source port, and connection protocol of the remote host to a proxied connection between the proxy server and the destination server.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodi

DETAILED DESCRIPTION OF THE INVENTION

Embodiments of the present invention provide a method, system and computer program product for managing remote resource visibility in a proxy server environment. In accordance with an embodiment of the present invention, a secure connection can be established between a proxy server and a remote visibility process in a destination server. Thereafter, after completing a proxy connection between the proxy server and the destination server on behalf of a remote host, remote host information including the IP address of the remote host, the protocol of the remote host, and port for the remote host along with connection identification information including source IP address, destination IP address, source port, destination port and connection protocol for a corresponding one of the proxied connections to the destination server over the secure connection can be passed to the remote visibility process over the secure connection. Subsequently, the IP address, protocol, and port of the remote host can be mapped to a connection provided by the proxy server on behalf of the remote host. In this way, the operating system and applications disposed within the destination server can maintain visibility of the remote host despite the presence of an intervening proxy server.

Figure 1:
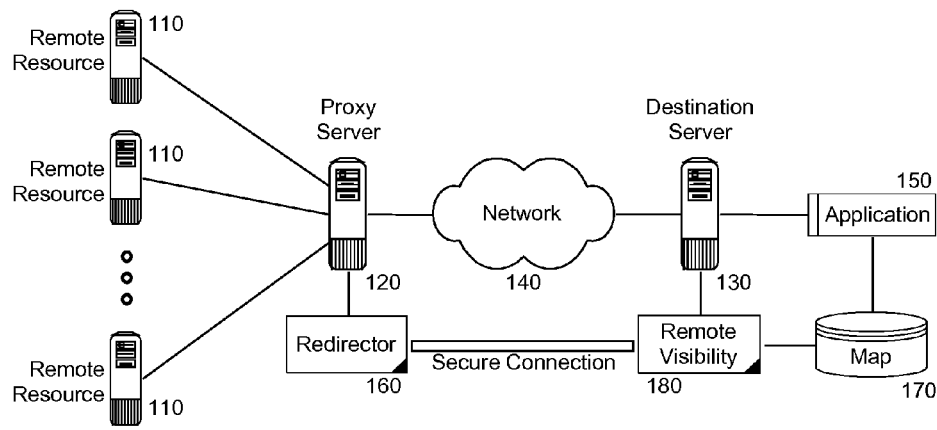
- FIG. 1 is a schematic illustration of a network data processing system configured for managing remote resource visibility in a proxy server environment; and, FIG. 2 is an event diagram illustrating a process for managing remote resource visibility in a proxy server environment.

In illustration, FIG. 1 is a schematic illustration of a network data processing system configured for managing remote resource visibility in a proxy server environment. The system can include a destination server 130 coupled to a proxy server 120 over a computer communications network 140. The destination server 130 can be configured to support the operation of one or more applications 150 (only a single application shown for the purpose of illustrative simplicity). The proxy server 120 can include a communicative configuration for coupling one or more remote hosts 110 so as to act as a proxy on behalf of the remote hosts 110 in interacting with the applications 150 in the destination server 130.

Notably, a redirector 160 can be coupled to the proxy server 120 and corresponding remote visibility logic 180 can be coupled to the destination server 130, with a secure connection established there between. The redirector 160 can be configured to forward to the remote visibility logic 180 an IP address, source port, and protocol for a remote host 110 and connection data (source/dest IP address, source/dest port, and protocol) for the proxy to destination server connection establishing a proxied connection through the proxy server 120 to the destination server 130. The remote visibility logic 180, in turn, can include program code enabled to associate the IP address, source port, and protocol for the remote host 110 with connection data provided by the proxy server 120 for the proxied connection in map 170. Consequently, the operating system in destination server 130 and application 150 can access the map 170 to maintain remote host visibility despite the proxied connection through the proxy server 120.

Figure 2:
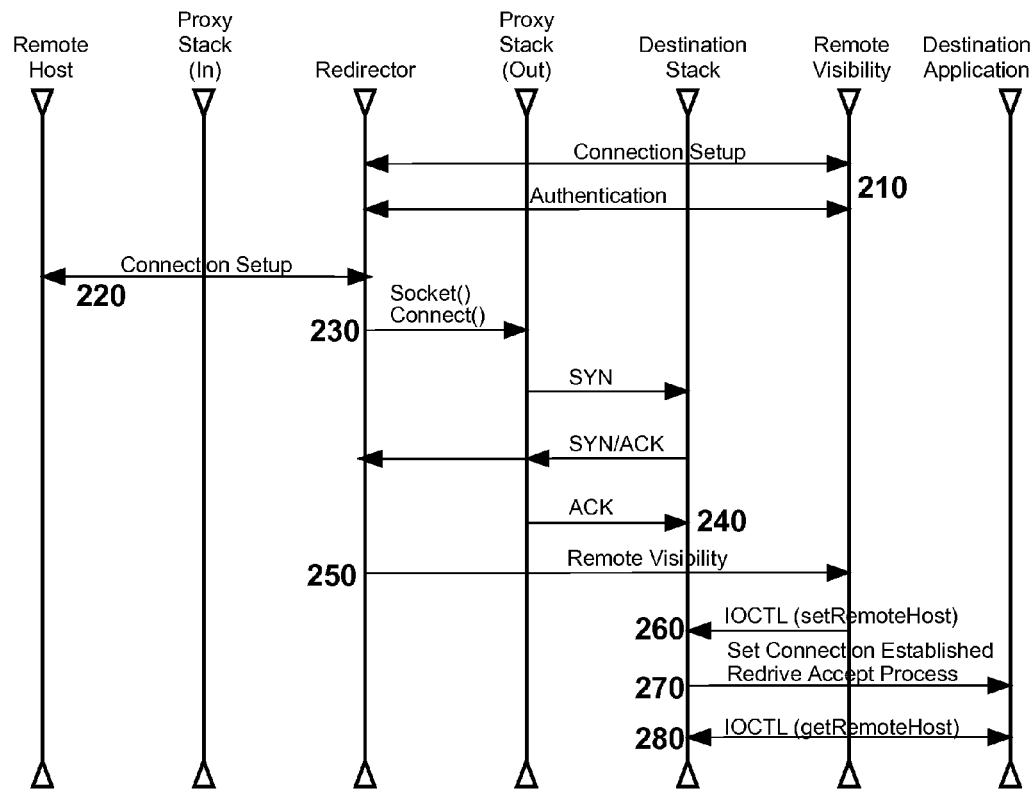

In further illustration, FIG. 2 is an event diagram illustrating a process for managing remote resource visibility in a proxy server environment. Beginning step 210, a secure connection can be established between a redirector in the proxy server and remote visibility logic in the destination server. Subsequently, multiple different remote hosts can request and consummate a proxied connection to a destination application in the destination server through the proxy server. Specifically, in step 220 a connection can be established with the redirector which in turn can set up a connection with the destination server in step 230.

In step 240, the completion of the connection can be withheld by the destination stack pending the secure transmission of the remote host information including the IP address of the remote host, the protocol of the remote host, and port for the remote host along with connection identification information including source IP address, destination IP address, source port, destination port and connection protocol for a corresponding one of the proxied connections to the destination server to the remote visibility logic over the secure connection. In this regard, in step 250 the remote host information, including IP address, port and protocol along with connection identification information including source IP address, destination IP address, source port, destination port and connection protocol for a corresponding one of the proxied connections to the destination server over the secure connection can be transmitted over the secure connection to the remote visibility logic and mapped to a proxied connection. Once the remote host information for the remote host has been mapped to the proxied connection, in step 260 the IP address, protocol and port for the remote host and its mapping to a connection between the proxy and destination server can be installed into the destination stack for the destination server where it is associated with a TCP connection control block (TCB). Subsequently, in step 270 the completion of the connection can be induced so as to complete pending accept calls made by the destination application.

Thereafter, the remote host information including the IP address of the remote host, the protocol of the remote host, and port for the remote host can be retrieved on request in block 280 from the destination stack for the benefit of the destination application. In this regard, the mapped remote IP address, port, and connection protocol evident within the transport control block (TCB) for the destination stack can be used for a number of destination server supported applications and stack services. Those stack services can include packet filtering applications, intrusion detection applications, and applications requiring policy-based decision making for remote hosts and IP to logical unit (LU) mapping for mainframe access.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A network data processing system configured for remote host visibility for proxied connections, the system comprising:
    a destination server hosting an application;
    a proxy server coupled to destination server over a computer communications network, the proxy server comprising a configuration to proxy connections between a plurality of remote hosts and the destination server;
    a secure connection established between the proxy server and the destination server separate from connections proxied by the proxy server; and,
    a redirector disposed in the proxy server, the redirector comprising a configuration to provide remote host information amongst the remote hosts to remote visibility logic disposed within the destination server, the remote visibility logic comprising program code enabled to map an IP address of the remote host in the remote host information to an IP address for a proxied connection between the remote host and the destination server, wherein
    the destination server is configured to block a completion of a connection for each new one of the proxied connections until a provided IP address for a remote host for the new one of the proxied connections has been mapped to an IP address for a new one of the proxied connections, and
    the blocking comprises withholding setting a connection as established in a destination stack for the destination server for each new one of the proxied connections until the provided IP address for the remote host for the new one of the proxied connections has been mapped to the IP address for the new one of the proxied connections.

2. The system of claim 1, wherein
    the destination server comprises the destination stack into which a mapping of the IP address of the remote host to the IP address for the proxied connection is stored.

3. The system of claim 1, wherein
    the remote host information comprises an IP address, port and protocol for the remote host.

4. A method for managing remote resource visibility in a proxy server environment, the method comprising:
    receiving, by a destination server over a secure connection between the destination server and a proxy server, an Internet protocol (IP) address for each of different remote hosts connected to the proxy server;
    receiving, by the destination server over the secure connection, connection identification information including source IP address, destination IP address, source port, destination port, and connection protocol for each of proxied different connections between the different remote hosts and the destination server;
    mapping, by the destination server, each provided IP address for each of the different remote hosts to an IP address for a corresponding one of the proxied different connections; and
    blocking a completion of a connection for each new one of the proxied connections until a provided IP address for a remote host for the new one of the proxied connections has been mapped to an IP address for a new one of the proxied connections, wherein
    the blocking comprises withholding setting a connection as established in a destination stack for the destination server for each new one of the proxied connections until the provided IP address for the remote host for the new one of the proxied connections has been mapped to the IP address for the new one of the proxied connections.

5. The method of claim 4, wherein
    the receiving the Internet protocol (IP) address comprises additionally receiving a port and protocol for each of the different remote hosts from the destination server over the secure connection.

6. The method of claim 4, wherein
    the mapping comprises installing each provided IP address for a remote host of a proxied different connection into a destination stack for the destination server in association with a corresponding IP address for the proxied different connection.

7. The method of claim 4, further comprising:
    reading a mapped IP address for a remote host coupled to the destination server over a proxied connection; and,
    performing packet filtering based upon the mapped IP address in the destination server.

8. The method of claim 4, further comprising:
    reading a mapped IP address for a remote host coupled to the destination server over a proxied connection; and,
    performing intrusion detection based upon the mapped IP address in the destination server.

9. The method of claim 4, further comprising:
    reading a mapped IP address for a remote host coupled to the destination server over a proxied connection; and,
    performing policy-based decision making in the destination server based upon the mapped IP address.

10. A computer program product comprising a computer usable storage medium, not including a transitory, propagating signal, having stored therein computer usable program code for managing remote resource visibility in a proxy server environment, the computer usable program code, which when executed by a computer hardware system, causes the computer hardware system to perform:
    receiving, by a destination server over a secure connection between the destination server and a proxy server, an Internet protocol (IP) address for each of different remote hosts connected to the proxy server;
    receiving, by the destination server over the secure connection, connection identification information including source IP address, destination IP address, source port, destination port, and connection protocol for each of proxied different connections between the different remote hosts and the destination server;

mapping, by the destination server, each provided IP address for each of the different remote hosts to an IP address for a corresponding one of the proxied different connections; and blocking a completion of a connection for each new one of the proxied connections until a provided IP address for a remote host for the new one of the proxied connections has been mapped to an IP address for a new one of the proxied connections, wherein the blocking comprises withholding setting a connection as established in a destination stack for the destination server for each new one of the proxied connections until the provided IP address for the remote host for the new one of the proxied connections has been mapped to the IP address for the new one of the proxied connections.

11. The computer program product of claim 10, wherein the receiving the Internet protocol (IP) address comprises additionally receiving a port and protocol for each of the different remote hosts to the destination server over the secure connection.

12. The computer program product of claim 10, wherein the mapping comprises installing each provided IP address for a remote host of a proxied different connection into a destination stack for the destination server in association with a corresponding IP address for the proxied different connection.

13. The computer program product of claim 10, further comprising:
reading a mapped IP address for a remote host coupled to the destination server over a proxied connection; and,
performing packet filtering based upon the mapped IP address in the destination server.

14. The computer program product of claim 10, further comprising:
reading a mapped IP address for a remote host coupled to the destination server over a proxied connection; and,
performing intrusion detection based upon the mapped IP address in the destination server.

15. The computer program product of claim 10, further comprising:
reading a mapped IP address for a remote host coupled to the destination server over a proxied connection; and,
performing policy-based decision making in the destination server based upon the mapped IP address.

* * * * *